US005923361A

United States Patent [19]

Sutton, Jr.

[11] Patent Number: 5,923,361

[45] Date of Patent: Jul. 13, 1999

[54] MULTIPLE SUBSCRIBER VIDEO-ON-DEMAND SYSTEM

[75] Inventor: Garnett Graham Sutton, Jr., Graham, N.C.

[73] Assignee: Lucent Technologies Inc., Murray Hill, N.J.

[21] Appl. No.: 08/642,831

[22] Filed: May 3, 1996

[51] Int. Cl.[6] ........ H04N 7/16

[52] U.S. Cl. ........ 348/8; 348/7

[58] Field of Search ........ 348/5.5, 6–8, 13; 380/10; 455/3.1, 6.1; 359/119; H04N 7/10, 7/16

[56] References Cited

U.S. PATENT DOCUMENTS

| | | | |
|---|---|---|---|
| 5,243,647 | 9/1993 | Parikh et al. | 380/10 |
| 5,455,698 | 10/1995 | Udd | 359/119 |
| 5,459,506 | 10/1995 | Bushnell | 348/7 |
| 5,512,934 | 4/1996 | Kochanski | 348/7 |
| 5,515,511 | 5/1996 | Nguyen et al. | 348/7 |
| 5,534,941 | 7/1996 | Sie et al. | 348/6 |
| 5,594,491 | 1/1997 | Hodge et al. | 348/7 |
| 5,600,364 | 2/1997 | Hendricks et al. | 348/6 |
| 5,631,693 | 5/1997 | Wunderlich et al. | 348/7 |
| 5,631,903 | 5/1997 | Dianda et al. | 348/7 |
| 5,640,453 | 6/1997 | Schuchman et al. | 348/7 |
| 5,661,517 | 8/1997 | Budow et al. | 348/13 |
| 5,673,430 | 9/1997 | Story | 348/7 |

*Primary Examiner*—Richard Lee

[57] ABSTRACT

A system which makes use of existing coax wiring to provide video-on-demand to individual subscribers. IP addressable, bi-directional video switches are used to replace traditional set-top cable boxes. The video switches are controlled by a network server which communicates with them over the existing coax wiring by using one of the frequencies previously used to transmit a VHF channel. The network server also controls video servers and a video head end, and it interfaces with the coax by means of a head end IP tap. Consequently, the network server can receive the subscriber's request for particular video programming, and it can order a video server to provide such programming to the subscriber, coordinating the programming, any desired frequency shifting, and the selection of the frequency on which the programming should be transmitted by the video head end and received by the subscriber's video switch.

7 Claims, 3 Drawing Sheets

MULTIPLE SUBSCRIBER VIDEO-ON-DEMAND SYSTEM

BACKGROUND OF THE INVENTION

The present invention relates to cable television ("CATV") systems. In particular, the invention relates to CATV systems in which individual subscribers have the ability to select specific programming, independently of other subscribers.

The present invention relates to a system which can be an integral solution to the problem of providing video program distribution where multiple subscribers are connected to a single coaxial feed via splitters. Heretofore, such systems often required that if an individual subscriber wished to view a specific program, i.e., a movie, then he had to wait until a specific start time for that movie. In many settings, it was desirable to be able to provide individual subscribers with the ability to select the specific program which they wanted to see, independently of any other subscriber, and to provide them with the capability of starting that program whenever they wished, i.e., so-called "Video-On-Demand". In such systems, each subscriber is able to request and receive Video-On-Demand without affecting other subscribers or viewing the programming selected by other subscribers.

The problem which has existed heretofore is that it has not been possible to readily provide Video-On-Demand to those CATV installations which had either been previously wired in a one-to-many arrangement, or which are currently being considered for wiring in a one-to-many arrangement, due to cost or space constraints. By way of example, in addition to residential CATV, commercial examples of CATV systems using a one-to-many arrangement would include cruise ships and college campuses. As the term is used herein, a "one-to-many" wiring arrangement refers to the splitting of multiple taps off a single coaxial cable, rather than wiring each endpoint in a star topology back to a central location, such as a wiring closet. The one-to-many arrangement is commonly in use, as such wiring has traditionally been considered to be a particularly attractive and cost effective approach to use with many CATV installations, because it was previously assumed that only a finite set of programs would be broadcast, even if some were scrambled for non-subscribers.

The downside of the one-to-many wiring arrangement is that we are now left with the legacy of those installations, even though the trend of what is expected of video distribution systems is rapidly moving toward "Video-On-Demand". Video-On-Demand must support "individually addressable subscribers", notwithstanding the current widespread use of the one-to-many wiring systems.

SUMMARY OF THE INVENTION

In accordance with the present invention, a multiple subscriber video-on-demand system is provided which makes use of legacy coax installations. The system typically includes at least one video server which may be individually addressed to begin to provide subscriber selected programming to a video head end. The system further includes a video head end having at least one modulator which receives video signals from the video server, and modulates those video signals. The video head end also includes a combiner which receives the output from each of the modulators and combines them into a combined video output for transmission, by a transmitter, over a single transmission path.

In accordance with the invention, the output from the video head end goes through a head end IP (see below) tap which passes the combined video to a splitter which has a single input and a number of outputs, one for each subscriber. Each subscriber has an IP addressable video switch which receives the combined video from the splitter output on a coax wire. In addition, the IP tap has circuitry to modulate and demodulate IP traffic which passes data between a network server and the video switches.

As used herein, individually addressable network devices are generally referred to as "IP" ("Internet Protocol") devices. While TCP/IP ("Transmission Control Protocol/Internet Protocol") is used in the preferred embodiment of the invention, other network protocols could be used without departing from the concept of the invention. Accordingly, the term "IP", as used herein, is not intended to be limiting, but merely representative of a protocol which provides the ability to individually address any resource on the network.

A network server is connected to the head end IP tap and to the video servers using dedicated network connections. The network server is able to communicate with each of the video switches through the head end IP tap. Accordingly, the network server can control both the video servers and the video switches, so that a subscriber can communicate to the network server the identification of video programming desired by the subscriber, and the network server can command one of the video servers to begin transmission of the requested video programming through the video head end. The network server is able to coordinate both the transmission of the programming by the video head end, and the reception of the programming by the subscriber's video switch, so that the subscriber's request can be fulfilled.

In alternative embodiments of the invention, scrambling apparatus, such as a frequency shifter, is employed at the video head end, and complementary descrambling apparatus is employed at the subscriber's video switch. In such situations, the network server controls both the scrambling and descrambling, so that the subscriber's video switch is able to provide an output signal compatible with the subscriber's viewing equipment. Thus, a typical output from a subscriber's video switch would be a signal on VHF channel 3 or 4,which could be viewed on a standard TV receiver.

DETAILED DESCRIPTION OF THE PREFERRED EMBODIMENT OF THE INVENTION

Figure 1:
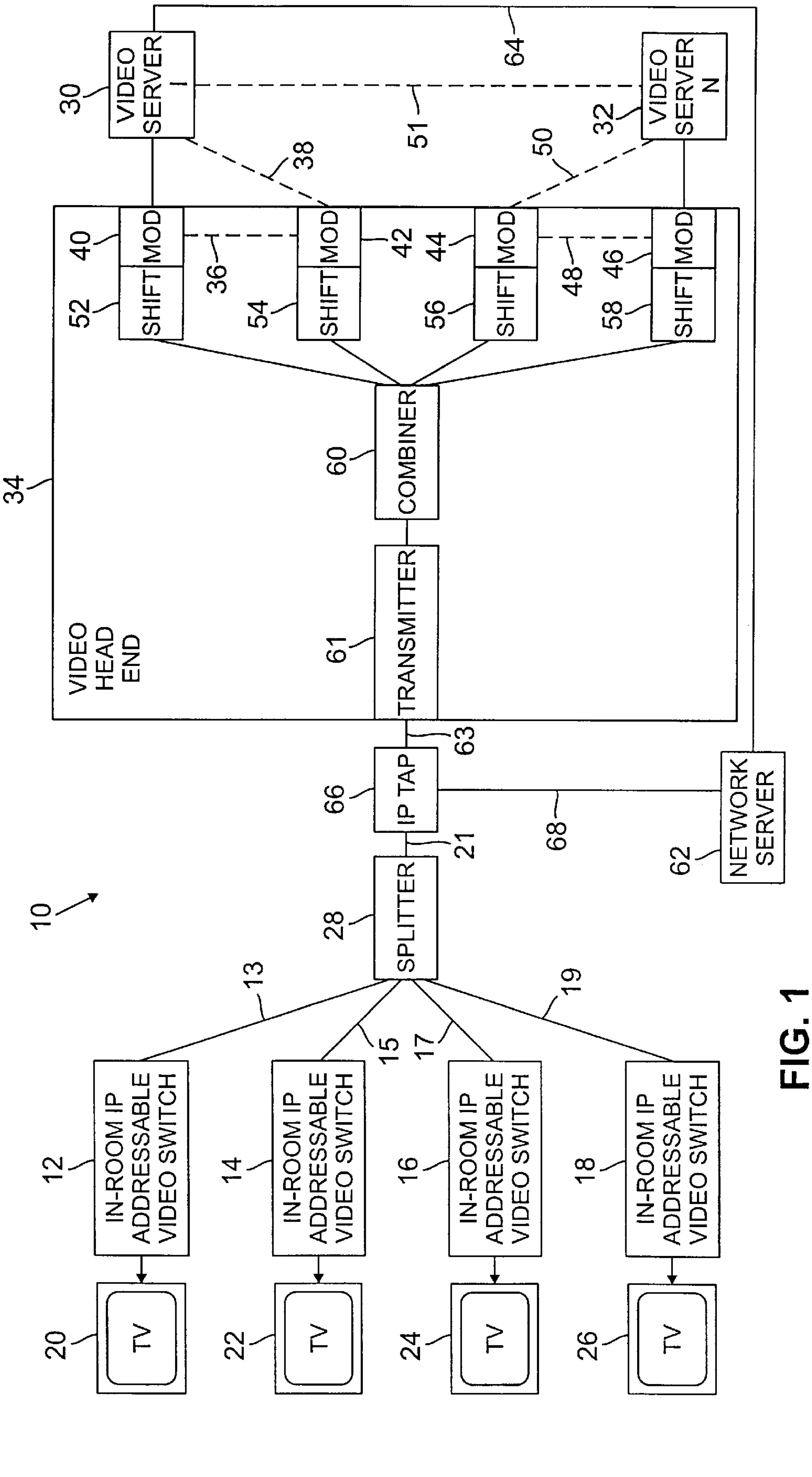
FIG. 1 illustrates an overall block diagram of a video network including the present invention.

Referring to FIG. 1, a block diagram illustrating a video network including the present invention 10 is shown. In particular, the present invention 10 uses a series of bi-directional, IP addressable, video switches 12, 14, 16, 18 which take the place of traditional CATV "Set-Top Boxes". The video switches 12, 14, 16, 18 are shown to be connected to television sets 20, 22, 24, 26, respectively. Further, the video switches 12, 14, 16, 18 receive their inputs over the pre-existing coax lines 13, 15, 17, 19 which were wired to a splitter 28.

In accordance with the invention, the bandwidth available from the splitter 28 is such that from approximately 300 to 900 channels of individual video can be available simultaneously by using MPEG (or other suitable) digital encoding techniques to transmit data digitally over the same standard transmission coax which was previously used to carry analog VHF/UHF signals. Thus, while only four IP addressable video switches 12, 14, 16, 18, are shown, many more video switches could be used in a typical system employing the present invention.

In accordance with the invention, the video switches 12, 14, 16, 18, are IP addressable, and they are each capable of being switched to a particular channel by an IP network. As will be explained hereinafter, in order to receive Video-On-Demand, a video switch is directed by the IP network to go to a particular channel, on which the "demanded" video has been programmed.

In order to program the selected video to appear on a particular channel, a series of N Video Servers, illustrated by Video Server 1 (shown at reference number 30), through Video Server N (shown at reference number 32) is used to bring subscriber selected video programming to a Video Head End 34. As is known to those skilled in the art, a Video Server is a device which is capable of bringing a number of different video programming selections into a system. By way of example, a typical Video Server may be able to handle sixty-four different programs simultaneously.

With reference to FIG. 1, Video Server 30 is shown (by use of dashed lines 36, 38) to be connected to a series of modulators 40, 42, which correspond to the number of channels of programming which Video Server 30 is able to output. Thus, if Video Server 30 can simultaneously handle sixty-four channels of programming, then modulators 40, 42 (with dashed line 36 therebetween), are intended to represent up to sixty-four individual modulators. Similarly, if Video Server 32 is able to simultaneously handle sixty-four channels of programming, then modulators 44, 46, are intended to represent up to sixty-four modulators, as indicated by the presence of dashed lines 48, 50. Finally, the dashed line 51 connecting Video Server 30 to Video Server 32, is intended to illustrate that the present invention 10 can utilize N different Video Servers, each feeding modulators within the Video Head End 34. As will be explained hereinafter, the selection of the number of Video Servers, N, will be determined by the number of subscribers and the number of channels of programming which each Video Server can handle. Thus, assuming that 900 channels of programming was desired, and that each Video Server can simultaneously handle up to sixty-four channels of programming, up to fifteen Video Servers can be used in that installation.

For security reasons, i.e., to prevent the unauthorized interception of programming, in the preferred embodiment of the invention each of the modulators 40, 42, 44, 46, is associated with a frequency shifter, 52, 54, 56, 58, respectively. The purpose of the frequency shifters, 52, 54, 56, 58 is to offset the frequencies of the modulated programming away from the standard VHF/UHF frequencies, and more recent digital frequency standards, to which the tuners of the TV sets 20, 22, 24, 26, can be tuned. This prevents an unauthorized user from intercepting programming by placing a TV set "upstream" of the Video Switches 12, 14, 16, 18, i.e., directly connected to a coax cable 13, 15, 17, 19. Whether or not the frequency shifters 52, 54, 56, 58, are used, it is necessary for the IP addressable Video Switches 12, 14, 16, 18 to include frequency shift circuitry, controllable by the Network Server 62, because the Video Switches 12, 14, 16, 18 must be able to selectively demodulate the program intended for a particular subscriber from the available 900 channels of programming and remodulate the video signal to correspond to a standard VHF or UHF frequency output which the tuner of the connected television set 20, 22, 24, 26 can handle. As is known by those skilled in the art, it is typical for such output to be on VHF channel 3 or 4, so that the TVs 20, 22, 24, 26, can remain on that preselected channel, independently of the frequency on which the subscriber selected video programming is transmitted by the Video Head End 34 to the video switch.

Because the use of frequency shifters 52, 54, 56, 58, is motivated by security concerns, their use is optional. However, due to the prevalence of cable theft, they are used in the preferred embodiment of the invention. Obviously, any alternative "scrambling" approach can be used, so long as the video switches include a compatible "descrambling" capability.

Once the subscriber selected programming has arrived at the frequency shifters 52, 54, 56, 58, it is transmitted to a combiner 60 which is also part of the Video Head End 34. The combiner 60, which is merely a "reverse splitter" combines the programming from the different frequency shifters 52, 54, 56, 58, each of which passes video programming to the combiner 60 at a different frequency. Thus, the output of the Video Head End 34 corresponds to a number of different "channels" of video with each channel having been individually subscriber selected. Also, at this point (i.e., coming out of the combiner 60), the various channels, do not correspond to VHF channels due to the presence of the frequency shifters 52, 54, 56, 58. Typically, before leaving the Video Head End 34 the output of the combiner 60 passes through a Transmitter 61. The Transmitter 61 is used to perform such amplification of the signals as may be required, and the Transmitter 61 also adapts the output signal to pass to a Head End IP Tap 66 over a line 63, which is typically either a coax cable or an optical fiber cable.

Through this point in the description of the preferred embodiment of the invention 10, only the passage of video programming information from the video servers 30, 32, to the Video Switches 12, 14, 16, 18, has been discussed. With continued reference to FIG. 1, the manner in which a subscriber makes an individual Video-On-Demand selection will be described. In particular, the invention 10 uses a Network Server 62 which is able to communicate with the IP Addressable Video Switches 12, 14, 16, 18, and with the Video Servers 30, 32.

Whereas the Network Server 62 can communicate directly with the Video Servers 30, 32 over a dedicated line 64, it cannot similarly communicate over dedicated lines to the Video Switches 12, 14, 16, 18, as the intent of the present invention is to provide Video-On-Demand to "legacy" systems which have no dedicated wiring (other than the pre-existing coax), without the need to now provide such wiring. Accordingly, all communications between the Network Server 62 and the Video Switches 12, 14, 16, 18, are accomplished by using the Head End IP Tap 66. As shown, the IP Tap 66 is connected to receive video signals from the Transmitter 61 and to pass them through to the splitter 28. In addition, the IP Tap 66 receives data signals directly from the Network Server 62 on a dedicated line 68 and communicates that data to the Video Switches 12, 14, 16, 18. This latter communication is accomplished by using one or more of the available VHF/UHF frequencies previously carried by the existing coax wiring from the splitter 28. Thus, all communications between the IP Tap 66 and the Video Switches 12, 14, 16, 18, make use of one or more of the video channels available on the coax lines between the IP Tap 66 and the Video Switches 12, 14, 16, 18, while the communications between the IP Tap 66 and the Network Server 62 are on the dedicated line 68. As will be obvious to those skilled in the art, the line 64, between the Network Server 62 and the Video Servers 30, 32, and the line 68, between the Network Server 62 and the IP Tap 66, can be by any suitable network connection, such as the standard 10 megabit Ethernet connection which is used in the preferred embodiment of the invention.

This design makes the Network Server 62 responsible for all intelligence, and it takes advantage of MPEG encoding/decoding to multiplex a large number of video channels on a single coaxial feed, thereby providing about 900 channels of digitally encoded programming over the same cable which was previously able to handle somewhat over 100 channels of analog VHF/UHF programming. Thus, if a particular subscriber did not subscribe to a particular premium channel, such as Home Box Office ("HBO"), the Network Server 62 will simply not instruct that subscriber's video switch to go to the appropriate channel to receive HBO. If a subscriber requests Video-On-Demand, the Network Server 62 and the subscriber's video server will find an available channel. Then, the Network Server 62 will instruct one of the Video Servers to start the video, and then the Network Server 62 will send the instruction to the subscriber's video switch to set it up for the appropriate frequency and start to decode and display the selection.

Only one IP tap is taken off each coaxial feed from the Video Head End 34 to be treated as a separate segment. In installations with 900 or fewer simultaneous channels, i.e., a cruise ship, only one IP tap would be required. Obviously, though, more could be incorporated if IP traffic needed to be reduced within the segment.

In the past, care has been taken, to make video cable channels compatible with tuners in conventional television sets 16, 24, 26, 28, in order to allow the connection of basic CATV services without requiring the use of a "Set-Top Box". The "Set-Top Box" was then used only to descramble the premium channels on CATV-ready sets, or to combine the VHF/UHF bands into the VHF input on older sets with separate mechanical tuners. However, since the video switch now selects the channel to be watched, the other channels are vulnerable only if the cable is viewed in front of (i.e., upstream of) one of the video switches. This, of course, would be a problem, because it would be relatively easy to bypass a video switch if it was only a channel limiting device.

One way of solving this security problem is presented by shifting the frequency band of each channel slightly, i.e., enough to make the signal incompatible with the timer in a standard television set, unless the signal has first been routed through one of the video switches, and this frequency shifting may, optionally, be accomplished within the Video Head End 34 by means of the shifters 52, 54, 56, 58. As will be described below, the video switches will need to have frequency shifting circuitry in any event, so there is little system overhead entailed in using the shifters 52, 54, 56, 58 as a security feature.

An IP addressable Video Switch, such as switches 12, 14, 16, 18 (described in further detail below as switch 100 of FIG. 1) is a bi-directional, IP addressable device which is designed to replace a traditional CATV "Set-Top Box". In order to maintain communications between the video switches 12, 14, 16, 18 and the Network Server 62 digital signals are sent over the coax lines between them. Those digital signals may make use of the bandwidth which was formerly used by one of the analog VHF or UHF channels. While the bandwidth of more than one of the channels could be used. Preferably, only the bandwidth of a single VHF channel is diverted for such use. In that regard, the system operates as a connectionless, collision oriented IP network, having very limited data traffic. Essentially, the complete traffic consists of passing originator identified tokens to the Network Server 62 by using the pre-existing coax 13, 15, 17, 19, 21 between the video switches 12, 14, 16, 18 and the IP Tap 66 and the dedicated line 68 between the IP Tap 66 and the Network Server 62. Similarly, the video switches 12, 14, 16, 18 will receive an individually addressed packet containing a "shift to channel (frequency) instruction" from the Network Server 62 via the same path. The "shift to channel instruction" accounts for any frequency shifting required for security. A decoder, which (in the preferred embodiment of the invention) is compliant with the standards of the Moving Picture Expert Group ("MPEG"), i.e., MPEG-1 or MPEG-2, is activated, and the video image is presented to the TV timer via the customary VHF channel 3 or 4.

Figure 2:
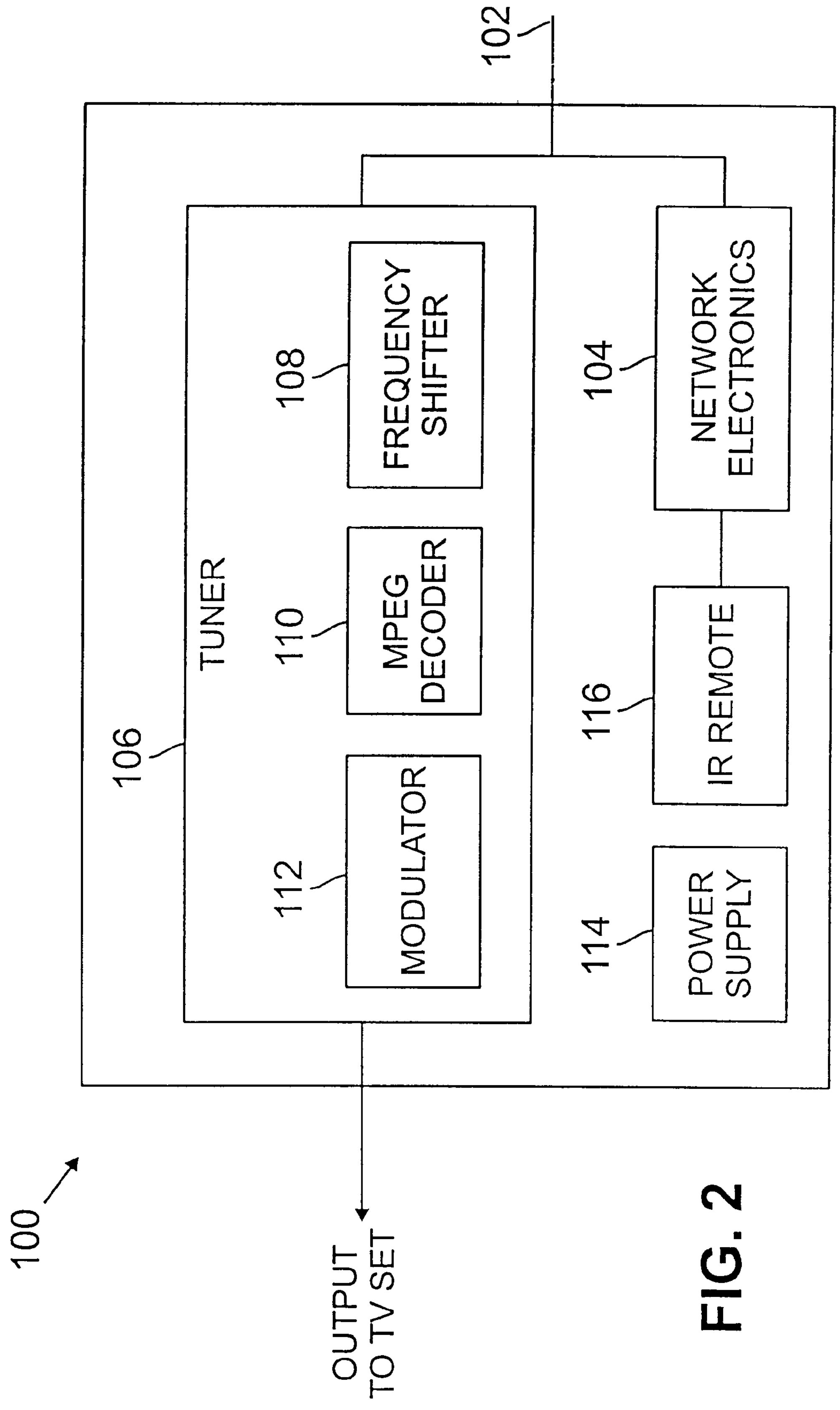
FIG. 2 illustrates a block diagram for a video switch in accordance with the present invention.

Referring now to FIG. 2, a video switch 100 in accordance with the present invention receives an input signal on a pre-existing coax line 102. Within the video switch 100, the coax line 102 is connected to both the network electronics 104, used to multiplex the 10 megabit Ethernet tap by diverting the use of one of the frequencies previously allocated to a single VHF (or UHF) channel, and to an electronic timer 106 which can be switched via instructions sent to its IP address. The video tuner 106 includes a frequency shifter 108 which is controlled by the network electronics 104. The frequency shifter 108 is used to select from the various frequencies coming in on the coax line 102, that particular frequency (as directed by the network electronics 104) on which the subscriber selected programming has been encoded. As will be obvious to those skilled in the art, as there is a need for the frequency shifter 108 in order to select the appropriate program from among the traffic on the coax, it does not matter whether the incoming signals on the coax 102 are at "normal" frequencies or at "secure" frequencies, i.e., "normal" frequencies which have been shifted by the shifters 52, 54, 56, 58 (See FIG. 1) to prevent an unauthorized viewer from connecting his TV set "upstream" of the video switch 100.

The video switch further includes an MPEG-1 or MPEG-2 (or other suitable) decoder 110, which decompresses the digital video signal and outputs it to a modulator 112 which modulates the decoded video image and transmits it on (typically) VHF channel 3 or 4 for display by a standard television set. Alternatively, the MPEG decoder 110 can output a video signal on a baseband frequency in the same manner as is done by a standard video camcorder, for direct input into a video monitor or the direct video inputs of a TV set.

The video switch 100 also includes a power supply 114 which powers the video switch in a manner well known to those skilled in the art. Accordingly, the connections between the power supply 114 and the other circuitry of the video switch has been omitted from FIG. 2 for the sake of clarity.

Finally, the video switch 100 includes a remote control interface 116, such as an infrared detector, together with appropriate electronics. In view of the decoding performed in the video switch 100, the TV tuner will not be aware of any frequency shifting performed at the Video Head End 34 for security purposes. As will be obvious to those skilled in the art, the use of frequency shifters 52, 54, 56, 58 for security purposes is only required to prevent unauthorized viewing on TV sets which have digital input capability, since a standard TV set having only an analog tuner could not be used upstream of the video switch 100, because it could not handle the digital signals which would be present. On the other hand, as the frequency shifters 108 are required in the video switch 100, whether or not the frequency shifters 52, 54, 56, 58 are present, there is little extra system expense to include them for security purposes.

Installations that have no need for security could configure systems without the frequency shifters 52, 54, 56, 58 by modifying a configuration table in the Network Server 66. Since the Network Server tells the video switches what frequency to select, a configuration table could either account for or not account for frequency shifting.

Figure 3:
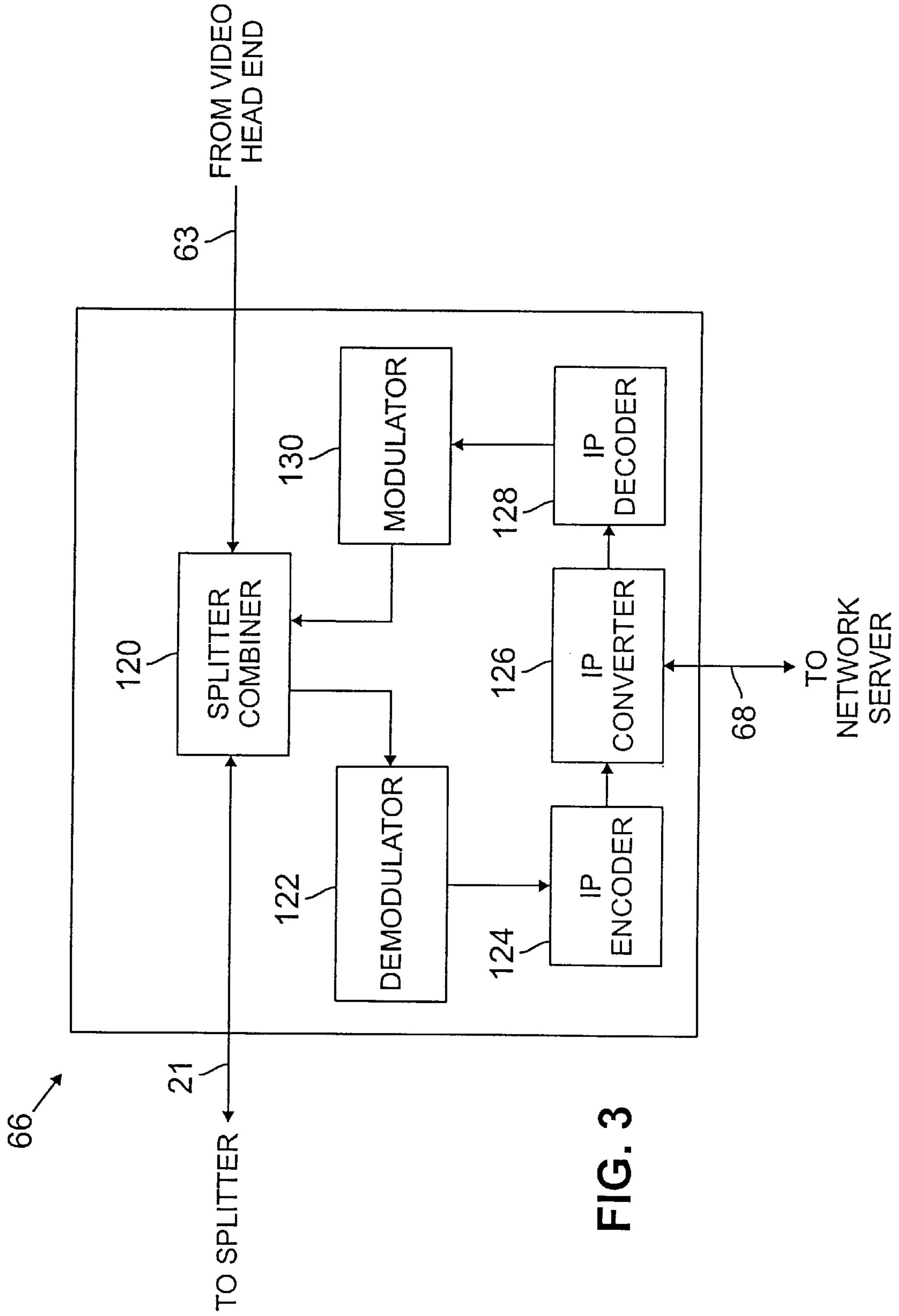
FIG. 3 illustrates a block diagram for a head end IP tap in accordance with the present invention.

With reference to FIG. 1, the IP Tap 66 is positioned between the video head end 34 and the splitter 28, which provides a multi-tapped coaxial cable feed. With reference now to FIG. 3, the IP Tap 66 has a line 63 which comes in from the video head end 34 and a line 21 which goes to the splitter 28. Within the IP Tap 66 there is a Splitter/Combiner 120 which has two functions. First it splits off the signal on the line 21, the frequency which has been dedicated to any data communications intended for the Network Server 66. Second, it combines onto the signal from the Video Head End 34 any data signals which the Network Server 66 is sending to any of the video switches.

The foregoing objectives of the IP Tap are accomplished, in the case of splitting, by a Demodulator 122, and IP Encoder 124, and an IP Converter 126. In the case of combining, the foregoing objectives are accomplished by the IP Converter 126, an IP Decoder 128, and a Modulator 130. Thus, a signal from a video switch will be demultiplexed off the 10 megabit Ethernet channel for the Network Server 66, and a signal intended for a video switch will be multiplexed onto the Ethernet channel. The IP Tap 66 and all of the video switches in any system will each have a unique MAC and IP address.

Although the problem described herein exists both for residential and commercial customers, the present invention is primarily directed at a solution for commercial customers, as the number of subscribers is limited. This approach has the advantage of limiting the scope of the solution to one that can be easily managed for a smaller group of subscribers. It is expected that this solution would be used where the number of subscribers is 30,000 or less, with no more than 900 simultaneous channels per multi-tapped coaxial cable feed.

I claim:

1. A multiple subscriber video-on-demand system comprising:

(a) video server means which is individually addressable to begin to provide subscriber selected programming to a video head end;

(b) said video head end having (i) at least one modulator means for modulating video signals provided by said video server means; and (ii) frequency shifting means associated with each of said at least one modulator means and receiving a video signal output therefrom;

(iii) combiner means for receiving a shifted video signal output from each of said frequency shifting means and combining them into a combined video output for transmission over a single transmission path;

(c) a head end IP tap which receives said combined video output of said combiner means, and passes said combined video output to a splitter having a single input and an output for each subscriber;

(d) an IP addressable video switch at each subscriber location which receives said combined video output from said splitter and transmits requests for programming to a network server through said splitter and said head end IP tap, each said IP addressable video switch further comprising means for frequency shifting said combined video output from said splitter;

(e) said network server being connected to said head end IP tap and to said video server means by means of dedicated network connections, said network server being able to communicate with each said IP addressable video switch through said head end IP tap, said network server controlling said means for frequency shifting in IP addressable video switches and controlling said frequency shifting means in said video head end;

whereby said network server can control both said video server means and said IP addressable video switches, such that a subscriber can communicate to said network server the requests for video programming, and said network server can command said video server means to begin transmission of such programming and said network server can coordinate both the transmission of said programming over said video head end, and the reception of said programming at one of said IP addressable video switches so that the request can be fulfilled.

2. The multiple subscriber video-on-demand system of claim 1, wherein said video head end further comprises a transmitter which receives its input from said combiner means, and places its output on a coax cable.

3. The multiple subscriber video-on-demand system of claim 2, wherein said coax cable from said video head end is attached to a coax connector input to said head end IP tap.

4. The multiple subscriber video-on-demand system of claim 1, wherein said video head end further comprises a transmitter which receives its input from said combiner means, and places its output on a fiber optic cable.

5. The multiple subscriber video-on-demand system of claim 4, wherein said fiber optic cable from said video head end is attached to a fiber optic cable connector input to said head end IP tap.

6. The multiple subscriber video-on-demand system of claim 1, wherein said head end IP tap includes means for splitting off data communications from said IP addressable video switches and sending them to said network server.

7. The multiple subscriber video-on-demand system of claim 1, wherein said head end IP tap includes means for combining data communication signals from said network server and sending them to said IP addressable video switches.

* * * * *